United States Patent
Koh et al.

(10) Patent No.: US 12,357,964 B2
(45) Date of Patent: Jul. 15, 2025

(54) STRUCTURED METAL-ORGANIC FRAMEWORK FIBER ADSORBENT FOR CAPTURING CARBON DIOXIDE AND MANUFACTURING METHOD THEREFOR

(71) Applicants: KOREA ADVANCED INSTITUTE OF SCIENCE AND TECHNOLOGY, Daejeon (KR); SAUDI ARABIAN OIL COMPANY, Dhahran (SA)

(72) Inventors: Dong Yeun Koh, Daejeon (KR); Young Hun Lee, Daejeon (KR); Aqil Jamal, Dhahran (SA)

(73) Assignees: KOREA ADVANCED INSTITUTE OF SCIENCE AND TECHNOLOGY, Daejeon (KR); SAUDI ARABIAN OIL COMPANY, Dhahran (SA)

( * ) Notice: Subject to any disclaimer, the term of this patent is extended or adjusted under 35 U.S.C. 154(b) by 820 days.

(21) Appl. No.: 17/619,481

(22) PCT Filed: Jun. 19, 2020

(86) PCT No.: PCT/KR2020/007939
§ 371 (c)(1),
(2) Date: Dec. 15, 2021

(87) PCT Pub. No.: WO2020/256450
PCT Pub. Date: Dec. 24, 2020

(65) Prior Publication Data
US 2022/0401915 A1 Dec. 22, 2022

(30) Foreign Application Priority Data
Jun. 19, 2019 (KR) .................. 10-2019-0073151

(51) Int. Cl.
*B01J 20/22* (2006.01)
*B01J 20/26* (2006.01)
(Continued)

(52) U.S. Cl.
CPC .......... *B01J 20/226* (2013.01); *B01J 20/267* (2013.01); *B01J 20/28023* (2013.01); *B01J 20/3064* (2013.01); *B01J 20/3085* (2013.01)

(58) Field of Classification Search
None
See application file for complete search history.

(56) References Cited

FOREIGN PATENT DOCUMENTS

| CN | 106268700 A | 1/2017 |
|---|---|---|
| CN | 106669636 A | 5/2017 |

(Continued)

OTHER PUBLICATIONS

Office Action issued in counterpart Saudi Arabia Patent Application No. 521431143 on Apr. 9, 2023.

(Continued)

*Primary Examiner* — Daniel Berns
(74) *Attorney, Agent, or Firm* — HULTQUIST, PLLC; Steven J. Hultquist

(57) ABSTRACT

Provided is a method for manufacturing a polymer fiber adsorbent having an MOF uniformly distributed in the matrix thereof, the method comprising the steps of: spinning a spinning dope comprising a polymer matrix and a metal precursor of an MOF to prepare a polymer fiber adsorbent precursor comprising the metal precursor; and contacting the polymer fiber adsorbent precursor with an organic ligand of the MOF to form an MOF in the polymer fiber adsorbent precursor. A polymer fiber adsorbent manufacturing method provided by an aspect of the present invention offers a method capable of easy synthesis of an MOF which is sensitive to water, thereby obtaining a polymer fiber adsorbent excellent in terms of adsorption performance and long-term stability.

16 Claims, 6 Drawing Sheets

(51) Int. Cl.
   *B01J 20/28*   (2006.01)
   *B01J 20/30*   (2006.01)

(56) References Cited

FOREIGN PATENT DOCUMENTS

| | | | |
|---|---|---|---|
| CN | 108786755 | A | 11/2018 |
| CN | 109876775 | A | 6/2019 |
| GB | 2089285 | A | 6/1982 |
| KR | 1020080021037 | A | 3/2008 |
| KR | 1020120021734 | A | 3/2012 |
| KR | 1020170119829 | A | 10/2017 |
| KR | 1020180043936 | A | 5/2018 |
| KR | 1020180117023 | A | 10/2018 |
| KR | 1020190050109 | A | 5/2019 |
| WO | 2009003174 | A1 | 12/2008 |
| WO | 2018126194 | A1 | 7/2018 |
| WO | 2019099086 | A1 | 5/2019 |

OTHER PUBLICATIONS

English Translation of Office Action issued in counterpart Saudi Arabia Patent Application No. 521431143 on Apr. 9, 2023.
Bian, Y., et al., "Metal-organic framework-based nanofiber filters for effective indoor air quality control", Journal of Materials Chemistry A, 2018, pp. 15807-15814, vol. 6, Publisher: Royal Society of Chemistry.
Office Action Issued in Chinese Patent Application No. 202080053455.3 on Jun. 27, 2023.
English Translation of Office Action Issued in Chinese Patent Application No. 202080053455.3 on Jun. 27, 2023.
Search Report Issued in Chinese Patent Application No. 202080053455.3 on Jun. 27, 2023.
EESR Issued in European Patent Application No. 20827862.2 on Jul. 14, 2023.
Pimentel, B.R., et al., "Synthesis of Water-Sensitive Metal-Organic Frameworks within Fiber Sorbent Modules", Industrial & Engineering Chemistry Research, 2017, vol. 56, Publisher: ASC Publications.

STRUCTURED METAL-ORGANIC FRAMEWORK FIBER ADSORBENT FOR CAPTURING CARBON DIOXIDE AND MANUFACTURING METHOD THEREFOR

CROSS-REFERENCE TO RELATED APPLICATIONS

This is a United States national phase under 35 USC § 371 of International Patent Application No. PCT/KR20/07939 filed Jun. 19, 2020, which in turn claims priority under 35 USC § 119 of Korean Patent Application No. 10-2019-0073151 filed Jun. 19, 2019. The disclosures of all such applications are hereby incorporated herein by reference in their respective entireties, for all purposes.

TECHNICAL FIELD

The present invention relates to a structured metal-organic framework fiber adsorbent for capturing carbon dioxide and a method of preparing the same, and more particularly to a metal-organic framework fiber adsorbent including a metal-organic framework (MOF) in a polymer matrix of a polymer fiber adsorbent precursor, wherein the metal-organic framework fiber adsorbent is prepared by spinning a spinning dope containing the polymer matrix and a metal precursor of the metal-organic framework (MOF) to prepare a polymer fiber adsorbent precursor and reacting the polymer fiber adsorbent precursor with an organic ligand, and a method of preparing the same.

BACKGROUND ART 30 to 40% of emitted $CO_2$, which is the main cause of global warming, is generated in thermal power plants, and the $CO_2$ concentration in exhaust gas is 150 mbar. In a fluidized bed for effective adsorption of gas on a solid adsorbent, adsorption proceeds from the bottom of the fluidized bed, and the concentration of $CO_2$ decreases to about 30 mbar when adsorption has proceeded to the top of the bed. Therefore, the solid adsorbent used in the fluidized bed must be able to exhibit adsorption capability over a wide $CO_2$ concentration range.

A solid adsorbent is a promising low-energy means for direct air capture as well as post-combustion gaseous $CO_2$ capture, but has drawbacks in that i) productivity is low, ii) regeneration is difficult, and iii) high costs are incurred for safe handling. The relatively low "swing" capacity of most solid adsorbent systems may increase both capital and operating expenditure since large amounts of materials must be used and stored. In addition, traditional solid adsorbent systems are problematic in that it is difficult to obtain the world-scale production capacity of aqueous amine-based systems.

In particular, metal-organic frameworks (MOFs) in solid adsorbents have a large surface area and the advantage of being able to control pores, so research is underway on the use of metal-organic frameworks (MOFs) as effective adsorbents for $CO_2$ capture.

Korean Patent Laid-Open Publication No. 10-2018-0043936 discloses a method for preparing a carbon dioxide adsorbent containing amines introduced at high density into a metal-organic framework, and Korean Patent Laid-Open Publication No. 10-2018-0117023 discloses an amine-functionalized MOF-based carbon dioxide adsorbent containing a binder, which is capable of effectively capturing carbon dioxide and improving mechanical strength to maintain adsorption capacity when reused.

However, MOFs having good performance, such as high $CO_2$ capacity and selectivity are unstable in moist or aqueous conditions. In fact, most MOFs may be classified as substances that are somewhat unstable in water, thus making industrial application thereof difficult. Paradoxically, the MOF materials having the best $CO_2$ capture performance are sensitive to water. For this reason, mass production of MOF adsorbents is very difficult.

Therefore, there is need for research on a novel MOF synthesis method that enables mass production of high-performance MOFs for use as adsorbents.

Accordingly, as a result of extensive efforts to solve the above problems, the present inventors found that a polymer fiber adsorbent including a metal-organic framework (MOF) in a polymer matrix of a polymer fiber adsorbent precursor could be prepared by spinning a spinning dope containing the polymer matrix and a metal precursor of the metal-organic framework (MOF) to prepare a polymer fiber adsorbent precursor and reacting the polymer fiber adsorbent precursor with an organic ligand, and the polymer fiber adsorbent prepared by the method enables easy synthesis of MOFs sensitive to water and exhibits excellent adsorption capacity and long-term stability.

DISCLOSURE

Therefore, it is an object of the present invention to provide a method of preparing a polymer fiber adsorbent containing MOFs uniformly distributed in a matrix having excellent $CO_2$ adsorption capacity and superior long-term stability, and a polymer fiber adsorbent prepared by the method.

In accordance with one aspect of the present invention, the above and other objects can be accomplished by the provision of a method of preparing a polymer fiber adsorbent including MOFs uniformly distributed in a polymer matrix, the method including (a) spinning a spinning dope containing the polymer matrix and a metal precursor of the MOFs to form a polymer fiber adsorbent precursor containing the metal precursor, and (b) contacting the polymer fiber adsorbent precursor with the organic ligand of the MOFs to form MOFs inside the polymer matrix of the polymer fiber adsorbent precursor.

In another aspect of the present invention, provided is a polymer fiber adsorbent including a monolithic fiber or a hollow fiber in which MOFs are uniformly distributed throughout a polymer matrix.

In another aspect of the present invention, provided is a method of manufacturing a polymer fiber adsorbent module, the method including spinning a spinning dope containing a polymer matrix and a metal precursor of MOFs to form a polymer fiber adsorbent precursor containing the metal precursor, loading a plurality of polymer fiber adsorbent precursors including the polymer fiber adsorbent precursor in a module to form a polymer fiber adsorbent precursor module, and contacting the polymer fiber adsorbent precursor module with an organic ligand of the MOFs to form the MOFs inside the polymer matrix of the polymer fiber adsorbent precursor.

In another aspect of the present invention, provided is a polymer fiber adsorbent module manufactured by the method, wherein the polymer fiber adsorbent module includes a monolithic fiber or a hollow fiber in which MOFs are uniformly distributed throughout the polymer matrix.

BEST MODE

Figure 1:
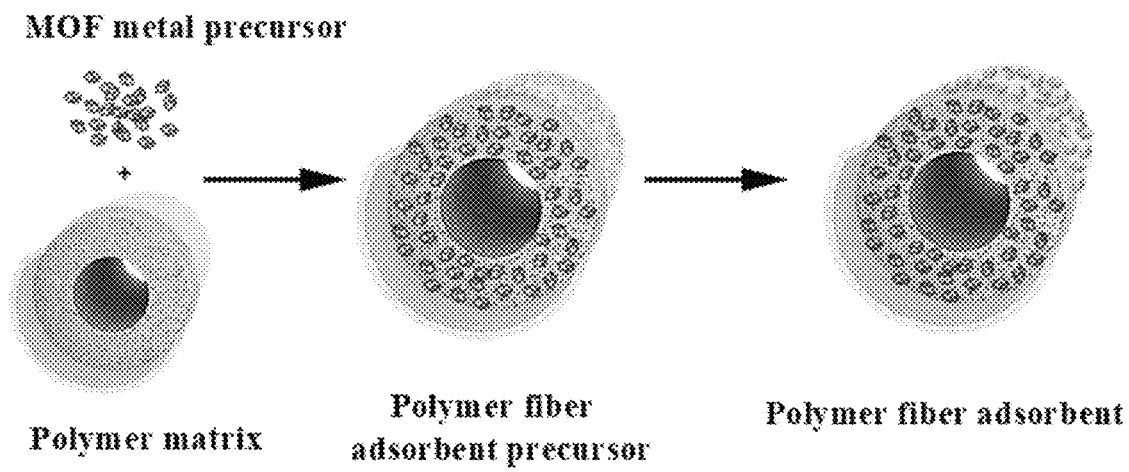
FIG. 1 is a schematic diagram illustrating a method for preparing a polymer fiber adsorbent according to an embodiment of the present invention.

Unless defined otherwise, all technical and scientific terms used herein have the same meanings as appreciated by those skilled in the field to which the present invention pertains. In general, the nomenclature used herein is well-known in the art and is ordinarily used.

The present invention is based on the finding that a polymer fiber adsorbent including a metal-organic framework (MOF) in a polymer matrix of a polymer fiber adsorbent precursor could be prepared by spinning a spinning dope containing the polymer matrix and a metal precursor of the metal-organic framework (MOF) to prepare a polymer fiber adsorbent precursor and reacting the polymer fiber adsorbent precursor with an organic ligand, and the polymer fiber adsorbent precursor prepared by the method enables easy synthesis of MOFs sensitive to water and exhibits excellent adsorption capacity and long-term stability.

Therefore, in one aspect, the present invention is directed to a method of preparing a polymer fiber adsorbent including MOFs uniformly distributed in a polymer matrix, the method including (a) spinning a spinning dope containing the polymer matrix and a metal precursor of the MOFs to form a polymer fiber adsorbent precursor containing the metal precursor, and (b) contacting the polymer fiber adsorbent precursor with the organic ligand of the MOFs to form MOFs inside the polymer matrix of the polymer fiber adsorbent precursor.

Therefore, in another aspect, the present invention is directed to a polymer fiber adsorbent including a monolithic fiber or a hollow fiber in which MOFs are uniformly distributed throughout a polymer matrix.

As used herein, the term "MOF" is an abbreviation for "metal-organic framework".

As used herein, the term "metal precursor of the MOF" refers to a substance that is capable of forming a metal part of the MOF.

As used herein, the term "organic ligand of the MOF" refers to a material capable of forming an organic part of the MOF.

As used herein, the term "polymer fiber adsorbent precursor" refers to a spun polymer fiber containing a MOF metal precursor.

As used herein, the term "polymer fiber adsorbent" refers to a spun polymer fiber having MOFs uniformly distributed therein.

As used herein, the term "polymer fiber adsorbent precursor module" refers to a module form of the polymer fiber adsorbent precursor described above.

As used herein, the term "polymer fiber adsorbent module" refers to a module form of the polymer fiber adsorbent described above.

In another aspect, the present invention is directed to a method of manufacturing a polymer fiber adsorbent module, the method including spinning a spinning dope containing a polymer matrix and a metal precursor of MOFs to form a polymer fiber adsorbent precursor containing the metal precursor, loading a plurality of polymer fiber adsorbent precursors including the polymer fiber adsorbent precursor in a module to form a polymer fiber adsorbent precursor module, and contacting the polymer fiber adsorbent precursor module with an organic ligand of the MOFs to form the MOFs inside the polymer matrix of the polymer fiber adsorbent precursor.

Hereinafter, respective steps of the method for preparing a polymer fiber adsorbent according to one aspect of the present invention will be described in detail.

First, the method of preparing a polymer fiber adsorbent according to one aspect includes spinning a spinning dope containing a polymer matrix and a metal precursor of MOFs to form a polymer fiber adsorbent precursor containing the metal precursor.

The polymer matrix may be, for example, an imide-based polymer or a sulfone-based polymer, but is not limited thereto. In one embodiment, the polymer matrix may be polyimide, polyetherimide, polyamideimide, cellulose acetate, polyvinylidene fluoride, polypropylene, or polyethylene, preferably polyetherimide, but is not limited thereto.

The polymer matrix may be present in the spinning dope in an amount of 5 wt % to 50 wt %, preferably 7 wt % to 30 wt %, more preferably 8 wt % to 15 wt %, and most preferably 9 wt % to 12 wt %.

The MOF may include one or more metal elements selected from the group consisting of Mg, Al, Y, Sc, Mo, Ti, V, Cr, Mn, Fe, Co, Ni, Cu, Zr, Cd, Ca, Pd, Pt, Au, Ag, Ru, Gd, Eu, Tb and Zn.

In addition, the MOF may include one or more organic molecules selected from 4,4'-dioxido-3,3'-biphenyl dicarboxylate, 2,5-dioxido-1,4-benzene dicarboxylate, 1,5-dioxide-2,6-naphthalenedicarboxylate, 4,4'-dioxido-3,3'-triphenyldicarboxylate, 2,5-dihydroxyterephthalic acid, 4-(4-carboxy-3-hydroxy-phenyl)-2-hydroxy-benzoic acid, 4,4'-ethynylenedibenzoic acid, 1,3,5-benzenetricarboxylate, 2-bromo-1,4-benzenedicarboxylic acid, pyridine-3-carboxylic acid, 2-methyl-1H-imidazole, 4-methyl-5-imidazolecarboxaldehyde, and biphenyl-4,4'-dicarboxylic acid.

The metal precursor of the MOF may include one or more selected from the group consisting of metal oxide, metal nitrate, metal acetate, metal bromide, and metal chloride.

The metal of the metal precursor is, for example, Mg, Al, Y, Sc, Mo, Ti, V, Cr, Mn, Fe, Co, Ni, Cu, Zr, Cd, Ca, Pd, Pt, Au, Ag, Ru, Gd, Eu, Tb or Zn, but is not limited thereto.

The metal precursor of the MOF may be present in the spinning dope in an amount of 10 wt % to 60 wt %, preferably 20 wt % to 55 wt %, more preferably 30 wt % to 50 wt %, even more preferably 40 wt % to 50 wt %, and most preferably 44 wt % to 45 wt %. When the metal precursor is present in an amount less than 10 wt %, there is a problem in that the $CO_2$ adsorption performance of the fiber adsorbent may be poor, and when the metal precursor is present in an amount greater than 60 wt %, there are problems in which the high viscosity of the dope solution makes the spinning process difficult and the resulting polymer fiber adsorbent is fragile.

The spinning dope may further contain a pore former.

The pore former may be, for example, $LiNO_3$, PVP, or $CaCO_3$, but is not limited thereto.

The pore former may be present in the spinning dope in an amount of 0.1 wt % to 10 wt %, preferably 0.1 wt % to 5 wt %, and more preferably 0.2 wt % to 2 wt %.

The spinning dope may contain a solvent and a non-solvent.

The solvent may be an organic solvent, for example, N-methyl-2-pyrrolidone (NMP), N,N-dimethylacetamide (DMAc), hexamethylphosphoramide (HMPA), N,N,N',N'-tetramethyl urea (TMU), N,N-dimethylformamide (DMF), or a mixture thereof, but is not limited thereto.

The solvent may be present in the spinning dope in an amount of 10 wt % to 70 wt %, preferably 30 wt % to 60 wt %, more preferably 35 wt % to 50 wt %, and even more preferably 40 wt % to 45 wt %.

The non-solvent may be water, alcohol, or glycol, but is not limited thereto.

The non-solvent may be present in the spinning dope in an amount of 0.1 wt % to 10 wt %, preferably 0.1 wt % to 5 wt %, and more preferably 0.2 wt % to 2 wt %.

The step is performed by a general spinning process, for example, a phase transition method. In one embodiment, the step may be performed by dry-jet wet spinning.

The phase transition method is performed as follows. Regarding the dope solution for spinning the fiber adsorbent, the solubility of the polymer and the interaction relating to the miscibility between the solvent and the non-solvent are important for the selection of materials in the step of preparing a dope, which is a polymer solution containing a polymer, an absorbent, a solvent, and a non-solvent. Also, a ternary diagram for predicting the binodal line must be prepared in order to determine the appropriate dope composition for fiber adsorbent spinning. This diagram provides information on the thermodynamic phenomena that occur during the preparation of fiber adsorbents by phase separation. During the spinning process, the dope solution discharged through the spinneret is immersed in a quench bath, and then a liquid-phase solution is converted to a solid in the quench bath through solvent exchange (phase separation) between the solvent of the primary dope composition and the non-solvent present in the quench bath. More specifically, in the dope solution phase separation process, the polymer-rich phase forms the structure of the fiber adsorbent, while the polymer-lean phase forms pores in the fiber adsorbent.

The metal precursor may be present in an amount of 30 wt % to 95 wt %, preferably 40 wt % to 90 wt %, more preferably 50 wt % to 85 wt %, and more preferably 60 wt % to 80 wt % in the polymer fiber adsorbent precursor. When the amount of the metal precursor in the polymer fiber adsorbent precursor after spinning is less than 30 wt %, there are problems in that the MOFs are not sufficiently formed and thus the adsorption performance is poor, and when the amount of the metal precursor is greater than 95 wt %, there are problems in which the high viscosity of the dope solution makes the spinning process difficult and in which the resulting polymer fiber adsorbent is fragile.

The spun polymer fiber adsorbent precursor may be a monolithic fiber or hollow fiber.

When a bore fluid is contained in the dope during the dope spinning process, the dope may be spun into the hollow fiber, and when the bore fluid is not contained therein, the dope may be spun into the monolithic fiber.

In one embodiment, the bore fluid may be $NMP/H_2O$.

After the step, the method may further include crosslinking the polymer fiber adsorbent precursor.

The crosslinking may be thermal crosslinking or chemical crosslinking. Preferably, the crosslinking may be chemical crosslinking.

The chemical crosslinking may be crosslinking with an amine group. The amine group may be provided from, for example, ethylenediamine (EDA) or p-xylylenediamine (XDA), but is not limited thereto.

The thermal crosslinking may be performed at 100° C. to 500° C., specifically 200° C. to 400° C., and more specifically 250° C. to 350° C.

The mechanical stability and chemical stability of the polymer fiber adsorbent may be improved by the crosslinking step.

Next, the method for preparing a polymer fiber adsorbent according to one aspect of the present invention includes bringing the polymer fiber adsorbent precursor module into contact with an organic ligand of the MOFs to form the MOFs inside the polymer matrix of the polymer fiber adsorbent precursor.

The organic ligand of the MOF may be 4,4'-dioxido-3,3'-biphenyldicarboxylate, 2,5-dioxido-1,4-benzenedicarboxylate, 1,5-dioxide-2,6-naphthalenedicarboxylate, 4,4'-dioxido-3,3'-triphenyldicarboxylate, 2,5-dihydroxyterephthalic acid, 4-(4-carboxy-3-hydroxy-phenyl)-2-hydroxy-benzoic acid, 4,4'-ethynylene dibenzoic acid, 1,3,5-benzenetricarboxylate, 2-bromo-1,4-benzenedicarboxylic acid, pyridine-3-carboxylic acid, 2-methyl-1H- imidazole, 4-methyl-5-imidazolecarboxaldehyde, or biphenyl-4,4'-dicarboxylic acid, but the present invention is not limited thereto.

When bringing the polymer fiber adsorbent precursor into contact with the organic ligand of the MOF, a reaction may occur, so the MOF metal precursor in the polymer fiber adsorbent precursor can be converted to MOFs.

The step may be performed at a temperature of 25° C. to 150° C., preferably 60° C. to 140° C., more preferably 70° C. to 130° C., and more preferably 80° C. to 130° C. When the reaction occurs at a temperature of less than 25° C., there is a problem in that the reaction between the MOF metal precursor and the organic ligand may not progress sufficiently, and when the reaction occurs at a temperature of higher than 150° C., there is a problem in that the polymer fiber adsorbent may be decomposed due to the high temperature.

The step may be performed for 10 minutes to 2,000 minutes, preferably for 20 minutes to 1,800 minutes, more preferably for 40 minutes to 1,600 minutes, even more preferably for 80 minutes to 1,500 minutes, still more preferably for 100 minutes to 1,500 minutes, more preferably for 200 minutes to 1,200 minutes, and more preferably for 400 minutes to 100 minutes.

The organic ligand may be added in an amount of 0.1 mmol to 1 mmol, preferably 0.2 mmol to 0.5 mmol, and more preferably 0.3 mmol to 0.4 mmol, with respect to 1 mmol of the polymer fiber adsorbent precursor.

The polymeric fiber adsorbent precursor may contact the free ligand solution in batch reactors and continuous flow module systems and thus may be converted to MOFs.

For example, in the contacting process, the polymer fiber adsorbent precursor may react through a solvothermal reaction with a solution in which the organic ligand of the MOF is dissolved.

The solvothermal reaction or solvothermal synthesis is a recently known liquid-phase synthesis method and yields various materials such as metals, semiconductors, ceramics, and polymers. This is performed using a solvent at a pressure of 1 to 10,000 atm and a temperature of 100 to 1,000° C. to facilitate the interaction of precursor materials that appear during synthesis.

In this step, a metal ion may be additionally supplied to the polymer fiber adsorbent precursor. The supplied metal ion may form a metal part of the MOF.

The supplied metal ion may include one or more metal ions selected from the group consisting of Mg, Al, Y, Sc, Mo, Ti, V, Cr, Mn, Fe, Co, Ni, Cu, Zr, Cd, Ca, Pd, Pt, Au, Ag, Ru, Gd, Eu, Tb, and Zn.

The method for preparing a polymer fiber adsorbent according to one aspect of the present invention may further include, after bringing the polymer fiber adsorbent precursor into contact with the organic ligand of the MOFs to form MOFs inside the polymer matrix of the polymer fiber adsorbent precursor, forming an amine group in the MOFs.

The step of forming of the amine group may be performed by bringing the polymer fiber adsorbent having the MOFs therein into contact with an amine-based material.

In an embodiment, the polymer fiber adsorbent may be immersed in a solution containing an amine-based material.

The amine-based material may be, for example, N,N-dimethylethylenediamine (mmen), but is not limited thereto, and any material capable of forming an amine group in the MOF may be used without limitation.

The amine functionalization of the MOF enables the carbon dioxide adsorbent to capture carbon dioxide with a low concentration. In particular, in order to capture carbon dioxide in the air, it is preferable to use a high-density amine group introduced into the cavity of the MOF. Introducing the high-density amine group enables remarkable improvement in the enthalpy of adsorption by the interaction between the amine group and the carbon atom of $CO_2$. This amine functionalization is achieved by grafting an amine group into the open metal site of the MOF, and the open metal site acts as a Lewis acid. In this case, the amine group can be well coordinated to the open metal site since it has two hydrogen groups. In addition, the remaining free amine groups can effectively capture $CO_2$ entering the cavity. In addition, the amine occupies the open metal site, which adsorbs $H_2O$ better than $CO_2$, thereby improving stability to water. In addition, this amine can form bicarbonate with the help of $H_2O$ during $CO_2$ adsorption, thus having better $CO_2$ adsorption capacity in the presence of water.

The finally prepared polymer fiber adsorbent may be a monolithic or hollow fiber.

When the polymer fiber adsorbent is a hollow fiber, the outer surface thickness of the polymer fiber adsorbent may be 100 μm to 1,000 μm, and the bore thickness thereof may be 50 μm to 1,000 μm.

The porosity of the polymer fiber adsorbent may be 30 vol % to 80 vol %.

In another aspect of the present invention, there is provided a polymer fiber adsorbent in which MOFs are distributed throughout a polymer matrix.

In the polymer fiber adsorbent, MOFs may not be concentrated at one side, but may be uniformly distributed throughout the polymer matrix.

The polymer matrix may be, for example, an imide-based polymer or a sulfone-based polymer, but is not limited thereto. In one embodiment, the polymer matrix may be polyimide, polyetherimide, polyamideimide, cellulose acetate, polyvinylidene fluoride, polypropylene, or polyethylene.

The MOF may include one or more metal elements selected from the group consisting of Mg, Al, Y, Sc, Mo, Ti, V, Cr, Mn, Fe, Co, Ni, Cu, Zr, Cd, Ca, Pd, Pt, Au, Ag, Ru, Gd, Eu, Tb and Zn.

In addition, the MOF may include one or more organic molecules selected from 4,4'-dioxido-3,3'-biphenyl dicarboxylate, 2,5-dioxido-1,4-benzene dicarboxylate, 1,5-dioxide-2,6-naphthalenedicarboxylate, 4,4'-dioxido-3,3'-triphenyldicarboxylate, 2,5-dihydroxyterephthalic acid, 4-(4-carboxy-3-hydroxy-phenyl)-2-hydroxy-benzoic acid, 4,4'-ethynylenedibenzoic acid, 1,3,5-benzenetricarboxylate, 2-bromo-1,4-benzenedicarboxylic acid, pyridine-3-carboxylic acid, 2-methyl-1H-imidazole, 4-methyl-5-imidazolecarboxaldehyde, and biphenyl-4,4'-dicarboxylic acid.

The polymer fiber adsorbent may have a surface area of 50 $m^2/g$ to 500 $m^2/g$, specifically 100 $m^2/g$ to 400 $m^2/g$, and more specifically 150 $m^2/g$ to 300 $m^2/g$.

The polymer fiber adsorbent may have a pore size of 10 nm to 1 μm, specifically 20 nm to 500 nm, more specifically 30 nm to 300 nm, and more specifically 50 nm to 200 nm.

The polymer fiber adsorbent may have a $CO_2$ adsorption capacity at 25° C. and 1 atm of 0.5 mmol/g, specifically 1 mmol/g, more specifically 2 mmol/g, and more specifically 4 mmol/g.

The polymer fiber adsorbent may be used to separate gas.

The polymer fiber adsorbent may be a monolithic or hollow fiber.

When the polymer fiber adsorbent is a hollow fiber, the outer surface thickness of the polymer fiber adsorbent may be 100 μm to 1,000 μm, and the bore thickness thereof may be 50 μm to 1,000 μm.

The porosity of the polymer fiber adsorbent may be 30 vol % to 80 vol %.

The polymer fiber adsorbent can further improve both the ability of the MOF to withstand water and the $CO_2$ adsorption capacity thereof, since it includes functionalized amine groups in the MOFs.

In another aspect, the present invention is directed to a method of manufacturing a polymer fiber adsorbent module, the method including spinning a spinning dope containing a polymer matrix and a metal precursor of MOFs to form a polymer fiber adsorbent precursor containing the metal precursor, loading a plurality of polymer fiber adsorbent precursors including the polymer fiber adsorbent precursor in a module to form a polymer fiber adsorbent precursor module, and bringing the polymer fiber adsorbent precursor module into contact with an organic ligand of the MOFs to form the MOFs inside the polymer matrix of the polymer fiber adsorbent precursor.

In another aspect, the present invention is directed to a polymer fiber adsorbent module manufactured by the method, wherein the polymer fiber adsorbent module includes a monolithic fiber or a hollow fiber in which MOFs are uniformly distributed throughout the polymer matrix.

Hereinafter, respective steps of the method for manufacturing a polymer fiber adsorbent module according to another aspect of the present invention will be described in detail.

Unless defined otherwise, all technical and scientific terms used herein have the same meanings as appreciated by those skilled in the field to which the present invention pertains. In general, the nomenclature used herein is well-known in the art and is ordinarily used.

The present invention is based on the finding that a polymer fiber adsorbent including a metal-organic framework (MOF) in a polymer matrix of a polymer fiber adsorbent precursor could be prepared by spinning a spinning dope containing the polymer matrix and a metal precursor of the metal-organic framework (MOF) to prepare a polymer fiber adsorbent precursor and reacting the polymer fiber adsorbent precursor with an organic ligand, and the polymer fiber adsorbent precursor prepared by the method enables easy synthesis of MOFs sensitive to water and exhibits excellent adsorption capacity and long-term stability.

Therefore, in one aspect, the present invention is directed to a method of preparing a polymer fiber adsorbent including MOFs uniformly distributed in a polymer matrix, the method including (a) spinning a spinning dope containing the polymer matrix and a metal precursor of the MOFs to form a polymer fiber adsorbent precursor containing the metal precursor, and (b) bringing the polymer fiber adsorbent precursor into contact with the organic ligand of the MOFs to form MOFs inside the polymer matrix of the polymer fiber adsorbent precursor.

Therefore, in another aspect, the present invention is directed to a polymer fiber adsorbent including a monolithic fiber or a hollow fiber in which MOFs are uniformly distributed throughout a polymer matrix.

As used herein, the term "MOF" is an abbreviation for "metal-organic framework".

As used herein, the term "metal precursor of the MOF" refers to a substance that is capable of forming a metal part of the MOF.

As used herein, the term "organic ligand of the MOF" refers to a material capable of forming an organic part of the MOF.

As used herein, the term "polymer fiber adsorbent precursor" refers to a spun polymer fiber containing a MOF metal precursor.

As used herein, the term "polymer fiber adsorbent" refers to a spun polymer fiber having MOFs uniformly distributed therein.

As used herein, the term "polymer fiber adsorbent precursor module" refers to a module form of the polymer fiber adsorbent precursor described above.

As used herein, the term "polymer fiber adsorbent module" refers to a module form of the polymer fiber adsorbent described above.

In another aspect, the present invention is directed to a method of manufacturing a polymer fiber adsorbent module, the method including spinning a spinning dope containing a polymer matrix and a metal precursor of MOFs to form a polymer fiber adsorbent precursor containing the metal precursor, loading a plurality of polymer fiber adsorbent precursors including the polymer fiber adsorbent precursor in a module to form a polymer fiber adsorbent precursor module, and bringing the polymer fiber adsorbent precursor module into contact with an organic ligand of the MOFs to form the MOFs inside the polymer matrix of the polymer fiber adsorbent precursor.

Hereinafter, respective steps of the method for preparing a polymer fiber adsorbent according to one aspect of the present invention will be described in detail.

First, the method of preparing a polymer fiber adsorbent includes spinning a spinning dope containing a polymer matrix and a metal precursor of MOFs to form a polymer fiber adsorbent precursor containing the metal precursor.

The polymer matrix may be, for example, an imide-based polymer or a sulfone-based polymer, but is not limited thereto. In one embodiment, the polymer matrix may be polyimide, polyetherimide, polyamideimide, cellulose acetate, polyvinylidene fluoride, polypropylene, or polyethylene, preferably polyetherimide, but is not limited thereto.

The polymer matrix may be present in the spinning dope in an amount of 5 wt % to 50 wt %, preferably 7 wt % to 30 wt %, more preferably 8 wt % to 15 wt %, and most preferably 9 wt % to 12 wt %.

The MOF may include one or more metal elements selected from the group consisting of Mg, Al, Y, Sc, Mo, Ti, V, Cr, Mn, Fe, Co, Ni, Cu, Zr, Cd, Ca, Pd, Pt, Au, Ag, Ru, Gd, Eu, Tb and Zn.

In addition, the MOF may include one or more organic molecules selected from 4,4'-dioxido-3,3'-biphenyl dicarboxylate, 2,5-dioxido-1,4-benzene dicarboxylate, 1,5-dioxide-2,6-naphthalenedicarboxylate, 4,4'-dioxido-3,3 triphenyldicarboxylate, 2,5-dihydroxyterephthalic acid, 4-(4-carboxy-3-hydroxy-phenyl)-2-hydroxy-benzoic acid, 4,4'-ethynylenedibenzoic acid, 1,3,5-benzenetricarboxylate, 2-bromo-1,4-benzenedicarboxylic acid, pyridine-3-carboxylic acid, 2-methyl-1H-imidazole, 4-methyl-5-imidazolecarboxaldehyde, and biphenyl-4,4'-dicarboxylic acid.

The metal precursor of the MOF may include one or more selected from the group consisting of metal oxide, metal nitrate, metal acetate, metal bromide, and metal chloride.

The metal of the metal precursor is, for example, Mg, Al, Y, Sc, Mo, Ti, V, Cr, Mn, Fe, Co, Ni, Cu, Zr, Cd, Ca, Pd, Pt, Au, Ag, Ru, Gd, Eu, Tb or Zn, but is not limited thereto.

The metal precursor of the MOF may be present in the spinning dope in an amount of 10 wt % to 60 wt %, preferably 20 wt % to 55 wt %, more preferably 30 wt % to 50 wt %, even more preferably 40 wt % to 50 wt %, and most preferably 44 wt % to 45 wt %. When the metal precursor is present in an amount less than 10 wt %, there is a problem in that the $CO_2$ adsorption performance of the fiber adsorbent may be poor, and when the metal precursor is present in an amount greater than 60 wt %, there are problems in which the high viscosity of the dope solution makes the spinning process difficult and the resulting polymer fiber adsorbent is fragile.

The spinning dope may further contain a pore former.

The pore former may be, for example, $LiNO_3$, PVP, or $CaCO_3$, but is not limited thereto.

The pore former may be present in the spinning dope in an amount of 0.1 wt % to 10 wt %, preferably 0.1 wt % to 5 wt %, and more preferably 0.2 wt % to 2 wt %.

The spinning dope may contain a solvent and a non-solvent.

The solvent may be an organic solvent, for example, N-methyl-2-pyrrolidone (NMP), N,N-dimethylacetamide (DMAc), hexamethylphosphoramide (HMPA), N,N,N',N'-tetramethyl urea (TMU), N,N-dimethylformamide (DMF), or a mixture thereof, but is not limited thereto.

The solvent may be present in the spinning dope in an amount of 10 wt % to 70 wt %, preferably 30 wt % to 60 wt %, more preferably 35 wt % to 50 wt %, and even more preferably 40 wt % to 45 wt %.

The non-solvent may be water, alcohol, or glycol, but is not limited thereto.

The non-solvent may be present in the spinning dope in an amount of 0.1 wt % to 10 wt %, preferably 0.1 wt % to 5 wt %, and more preferably 0.2 wt % to 2 wt %.

The step is performed by a general spinning process, for example, a phase transition method. In one embodiment, the step may be performed by dry-jet wet spinning.

The phase transition method is performed as follows. Regarding the dope solution for spinning the fiber adsorbent, the solubility of the polymer and the interaction relating to the miscibility between the solvent and the non-solvent are important for the selection of materials in the step of preparing a dope, which is a polymer solution containing a polymer, an absorbent, a solvent, and a non-solvent. Also, a ternary diagram for predicting the binodal line must be prepared in order to determine the appropriate dope composition for fiber adsorbent spinning. This diagram provides information on the thermodynamic phenomena that occur during the preparation of fiber adsorbents by phase separation. During the spinning process, the dope solution discharged through the spinneret is immersed in a quench bath, and then a liquid-phase solution is converted to a solid in the quench bath through solvent exchange (phase separation) between the solvent of the primary dope composition and the non-solvent present in the quench bath. More specifically, in the dope solution phase separation process, the polymer-rich phase forms the structure of the fiber adsorbent, while the polymer-lean phase forms pores in the fiber adsorbent.

The metal precursor may be present in an amount of 30 wt % to 95 wt %, preferably 40 wt % to 90 wt %, more preferably 50 wt % to 85 wt %, and more preferably 60 wt % to 80 wt % in the polymer fiber adsorbent precursor. When the amount of the metal precursor in the polymer fiber adsorbent precursor after spinning is less than 30 wt %, there are problems in that the MOFs are not sufficiently formed and thus the adsorption performance is poor, and when the amount of the metal precursor is greater than 95 wt %, there are problems in which the high viscosity of the dope solution makes the spinning process difficult and in which the resulting polymer fiber adsorbent is fragile.

The spun polymer fiber adsorbent may be a monolithic fiber or hollow fiber.

When a bore fluid is contained in the dope during the dope spinning process, the dope may be spun into the hollow fiber, and when the bore fluid is not contained therein, the dope may be spun into the monolithic fiber.

In one embodiment, the bore fluid may be $NMP/H_2O$.

After the step, the method may further include crosslinking the polymer fiber adsorbent precursor.

The crosslinking may be thermal crosslinking or chemical crosslinking. Preferably, the crosslinking may be chemical crosslinking.

The chemical crosslinking may be crosslinking with an amine group. The amine group may be provided from, for example, ethylenediamine (EDA) or p-xylylenediamine (XDA), but is not limited thereto.

The thermal crosslinking may be performed at 100° C. to 500° C., specifically 200° C. to 400° C., and more specifically 250° C. to 350° C.

The mechanical stability and chemical stability of the polymer fiber adsorbent may be improved by the crosslinking step.

Next, the method for preparing a polymer fiber adsorbent according to one aspect of the present invention includes bringing the polymer fiber adsorbent precursor module into contact with an organic ligand of the MOFs to form the MOFs inside the polymer matrix of the polymer fiber adsorbent precursor.

The organic ligand of the MOF may be 4,4'-dioxido-3,3'-biphenyldicarboxylate, 2,5-dioxido-1,4-benzenedicarboxylate, 1,5-dioxide-2,6-naphthalenedicarboxylate, 4,4'-dioxido-3,3'-triphenyldicarboxylate, 2,5-dihydroxyterephthalic acid, 4-(4-carboxy-3-hydroxyphenyl)-2-hydroxy-benzoic acid, 4,4'-ethynylene dibenzoic acid, 1,3,5-benzenetricarboxylate, 2-bromo-1,4-benzenedicarboxylic acid, pyridine-3-carboxylic acid, 2-methyl-1H-imidazole, 4-methyl-5-imidazolecarboxaldehyde, or biphenyl-4,4'-dicarboxylic acid, but the present invention is not limited thereto.

When bringing the polymer fiber adsorbent precursor into contact with the organic ligand of the MOF, a reaction may occur, so the MOF metal precursor in the polymer fiber adsorbent precursor can be converted to MOFs.

The step may be performed at a temperature of 25° C. to 150° C., preferably 60° C. to 140° C., more preferably 70° C. to 130° C., and more preferably 80° C. to 130° C. When the reaction occurs at a temperature of less than 25° C., there is a problem in that the reaction between the MOF metal precursor and the organic ligand may not progress sufficiently, and when the reaction occurs at a temperature of higher than 150° C., there is a problem in that the polymer fiber adsorbent may be decomposed due to the high temperature.

The step may be performed for 10 minutes to 2,000 minutes, preferably for 20 minutes to 1,800 minutes, more preferably for 40 minutes to 1,600 minutes, even more preferably for 80 minutes to 1,500 minutes, still more preferably for 100 minutes to 1,500 minutes, more preferably for 200 minutes to 1,200 minutes, and more preferably for 400 minutes to 100 minutes.

The organic ligand may be added in an amount of 0.1 mmol to 1 mmol, preferably 0.2 mmol to 0.5 mmol, and more preferably 0.3 mmol to 0.4 mmol, with respect to 1 mmol of the polymer fiber adsorbent precursor.

The polymeric fiber adsorbent precursor may contact the free ligand solution in batch reactors and continuous flow module systems and thus may be converted to MOFs.

For example, in the contacting process, the polymer fiber adsorbent precursor may react through a solvothermal reaction with a solution in which the organic ligand of the MOF is dissolved.

The solvothermal reaction or solvothermal synthesis is a recently known liquid-phase synthesis method and yields various materials such as metals, semiconductors, ceramics, and polymers. This is performed using a solvent at a pressure of 1 to 10,000 atm and a temperature of 100 to 1,000° C. to facilitate the interaction of precursor materials that appear during synthesis.

In this step, a metal ion may be additionally supplied to the polymer fiber adsorbent precursor. The supplied metal ion may form a metal part of the MOF.

The supplied metal ion may include one or more metal ions selected from the group consisting of Mg, Al, Y, Sc, Mo, Ti, V, Cr, Mn, Fe, Co, Ni, Cu, Zr, Cd, Ca, Pd, Pt, Au, Ag, Ru, Gd, Eu, Tb, and Zn.

The method for preparing a polymer fiber adsorbent according to one aspect of the present invention may further include, after bringing the polymer fiber adsorbent precursor into contact with the organic ligand of the MOFs to form MOFs inside the polymer matrix of the polymer fiber adsorbent precursor, forming an amine group in the MOFs.

The step of forming of the amine group may be performed by bringing the polymer fiber adsorbent having the MOFs therein into contact with an amine-based material.

In an embodiment, the polymer fiber adsorbent may be immersed in a solution containing an amine-based material.

The amine-based material may be, for example, N,N-dimethylethylenediamine (mmen), but is not limited thereto, and any material capable of forming an amine group in the MOF may be used without limitation.

The amine functionalization of the MOF enables the carbon dioxide adsorbent to capture carbon dioxide with a low concentration. In particular, in order to capture carbon dioxide in the air, it is preferable to use a high-density amine group introduced into the cavity of the MOF. Introducing the high-density amine group enables remarkable improvement in the enthalpy of adsorption by the interaction between the amine group and the carbon atom of $CO_2$. This amine functionalization is achieved by grafting an amine group into the open metal site of the MOF, and the open metal site acts as a Lewis acid. In this case, the amine group can be well coordinated to the open metal site since it has two hydrogen groups. In addition, the remaining free amine groups can effectively capture $CO_2$ entering the cavity. In addition, the amine occupies the open metal site, which adsorbs $H_2O$ better than $CO_2$, thereby improving stability to water. In addition, this amine can form bicarbonate with the help of $H_2O$ during $CO_2$ adsorption, thus having better $CO_2$ adsorption capacity in the presence of water. The finally prepared polymer fiber adsorbent may be a monolithic or hollow fiber.

When the polymer fiber adsorbent is a hollow fiber, the outer surface thickness of the polymer fiber adsorbent may be 100 μm to 1,000 μm, and the bore thickness thereof may be 50 μm to 1,000 μm.

The porosity of the polymer fiber adsorbent may be 30 vol % to 80 vol %.

In another aspect of the present invention, there is provided a polymer fiber adsorbent in which MOFs are distributed throughout a polymer matrix.

In the polymer fiber adsorbent, MOFs may not be concentrated at one side, but may be uniformly distributed throughout the polymer matrix.

The polymer matrix may be, for example, an imide-based polymer or a sulfone-based polymer, but is not limited thereto. In one embodiment, the polymer matrix may be polyimide, polyetherimide, polyamideimide, cellulose acetate, polyvinylidene fluoride, polypropylene, or polyethylene.

The MOF may include one or more metal elements selected from the group consisting of Mg, Al, Y, Sc, Mo, Ti, V, Cr, Mn, Fe, Co, Ni, Cu, Zr, Cd, Ca, Pd, Pt, Au, Ag, Ru, Gd, Eu, Tb and Zn.

In addition, the MOF may include one or more organic molecules selected from 4,4'-dioxido-3,3'-biphenyl dicarboxylate, 2,5-dioxido-1,4-benzene dicarboxylate, 1,5-dioxide-2,6-naphthalenedicarboxylate, 4,4'-dioxido-3,3'-triphenyldicarboxylate, 2,5-dihydroxyterephthalic acid, 4-(4-carboxy-3-hydroxy-phenyl)-2-hydroxy-benzoic acid, 4,4'-ethynylenedibenzoic acid, 1,3,5-benzenetricarboxylate, 2-bromo-1,4-benzenedicarboxylic acid, pyridine-3-carboxylic acid, 2-methyl-1H-imidazole, 4-methyl-5-imidazolecarboxaldehyde, and biphenyl-4,4'-dicarboxylic acid.

The polymer fiber adsorbent may have a surface area of 50 m$^2$/g to 500 m$^2$/g, specifically 100 m$^2$/g to 400 m$^2$/g, and more specifically 150 m$^2$/g to 300 m$^2$/g.

The polymer fiber adsorbent may have a pore size of 10 nm to 1 μm, specifically 20 nm to 500 nm, more specifically 30 nm to 300 nm, and more specifically 50 nm to 200 nm.

The polymer fiber adsorbent may have a $CO_2$ adsorption capacity at 25° C. and 1 atm of 0.5 mmol/g, specifically 1 mmol/g, more specifically 2 mmol/g, and more specifically 4 mmol/g.

The polymer fiber adsorbent may be used to separate gas.

The polymer fiber adsorbent may be a monolithic or hollow fiber.

When the polymer fiber adsorbent is a hollow fiber, the outer surface thickness of the polymer fiber adsorbent may be 100 μm to 1,000 μm, and the bore thickness thereof may be 50 μm to 1,000 μm.

The porosity of the polymer fiber adsorbent may be 30 vol % to 80 vol %.

The polymer fiber adsorbent can further improve both the ability of the MOF to withstand water and the $CO_2$ adsorption capacity thereof, since it includes functionalized amine groups in the MOFs.

In another aspect, the present invention is directed to a method of manufacturing a polymer fiber adsorbent module, the method including spinning a spinning dope containing a polymer matrix and a metal precursor of MOFs to form a polymer fiber adsorbent precursor containing the metal precursor, loading a plurality of polymer fiber adsorbent precursors including the polymer fiber adsorbent precursor in a module to form a polymer fiber adsorbent precursor module, and bringing the polymer fiber adsorbent precursor module into contact with an organic ligand of the MOFs to form the MOFs inside the polymer matrix of the polymer fiber adsorbent precursor.

In another aspect, the present invention is directed to a polymer fiber adsorbent module manufactured by the method, wherein the polymer fiber adsorbent module includes a monolithic fiber or a hollow fiber in which MOFs are uniformly distributed throughout the polymer matrix.

Hereinafter, respective steps of the method for manufacturing a polymer fiber adsorbent module according to another aspect of the present invention will be described in detail.

Example 1

Preparation of Raw Materials

Polyetherimide (PEI, melt index of 9 g/10 min) as a polymer matrix and magnesium oxide (MgO, 99.5%, 300 nm) as a MOF precursor were prepared. 4,4'-dihydroxybiphenyl (97%), potassium bicarbonate (≥99.95% on a trace metal basis, 99.7 to 100.5% on a dry basis), and 1,2,4-trichlorobenzene (anhydrous, ≥99%) were used as $H_4$ (dobpdc) ligand sources. N-methyl-2-pyrrolidone (NMP, 99.5%) was used as a solvent for the spinning dope solution, and lithium nitrate ($LiNO_3$, anhydride, 99%) was purchased and used as a pore former to form the porous structure of the polymer matrix. In order to remove residual NMP and water from the as-spun fiber, methanol (ACS reagent, 99.8%) and n-hexane (ACS reagent, >98.5%) were used in the solvent exchange process. N,N'-dimethylethylenediamine (mmen, 98%) was used as a diamine source during the introduction of a diamine group. All other chemicals, solvents and non-solvents were used without further purification or modification.

Figure 2:
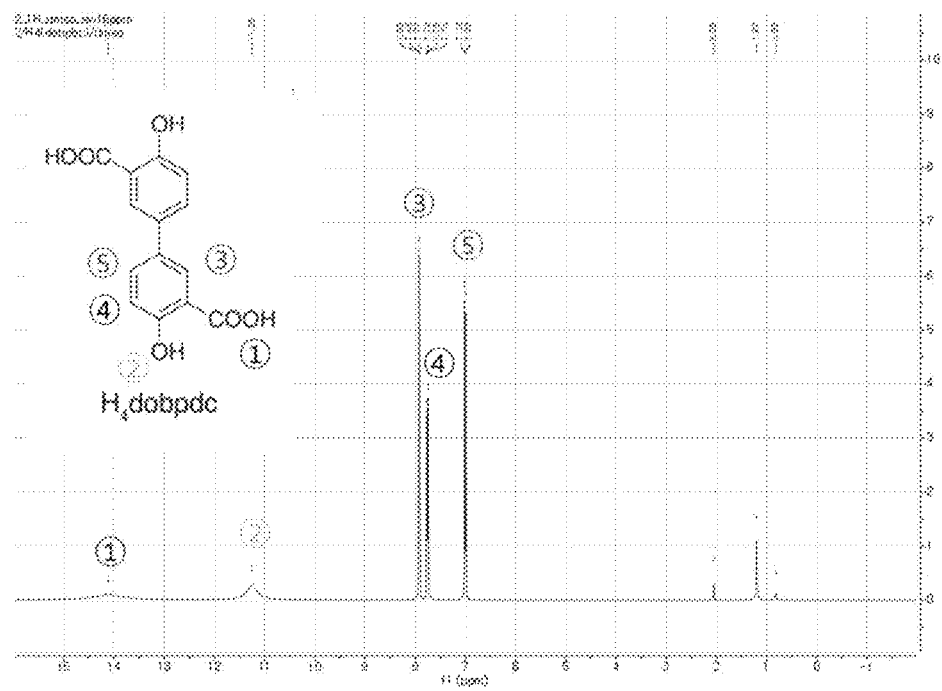
FIG. 2 is a graph showing the result of $^1$H NMR analysis of an organic ligand according to an embodiment of the present invention.

Preparation of $H_4$ (Dobpdc) Ligand $H_4$ (dobpdc) was synthesized using a simple and easy solvothermal reaction and a multiple filtration process. Briefly, $KHCO_3$ (4.00 g, 40.0 mmol), 4,4'-dihydroxybiphenyl (2.32 g, 12.48 mmol), and 1,2,4-trichlorobenzene (6 ml) in a Teflon-lined solution were placed in a stainless steel autoclave and heated at 250° C. for 17 hours. After the solvothermal reaction, the mixture was washed with diethyl ether and filtered. The collected crystal sample was immersed in deionized water (600 ml) for 12 hours and filtered again. Hydrochloric acid was added to the filtrate using a syringe (10 mL) until the pH reached 2, a white precipitate was formed, and the precipitate was granulated by filtration. The resulting material was recrystallized in acetone/deionized water (50/50 ml) per g of the product overnight at 4° C. FIG. 2 shows $^1H$ NMR (300 MHz, DMSO-$d_6$) of a successfully synthesized $H_4$ (dobpdc) ligand. Peaks corresponding to 3 solvents and 5 protons were observed in FIG. 2: δ=14.04 (br, 2H), 11.25 (br, 2H), 7.93 (s, 2H), 7.80 (d, 2H), 7.05 (d, 2H).

Preparation of MgO/PEI Spinning Dope and Spinning

The material composition of the spinning dope includes PEI (polymer matrix), MgO (MOF metal precursor), NMP (solvent), water (non-solvent), and $LiNO_3$ (pore former). In order to remove the adsorbed water, poly(ether)imide (PEI) and lithium nitrate ($LiNO_3$) were vacuum-dried at 100° C. for 12 hours. Table 1 shows all dope ingredients used in this experiment.

TABLE 1

| Ingredient | Polymer<br>PEI<br>(wt %) | Solvent<br>NMP<br>(wt %) | Non-solvent | | MOF metal<br>precursor<br>MgO (wt %) |
|---|---|---|---|---|---|
| | | | Water<br>(wt %) | $LiNO_3$<br>(wt %) | |
| Fiber #1 | 25 | 38 | 7.5 | 4.5 | 25 |
| Fiber #2 | 10 | 56 | 0.5 | 0.5 | 33 |
| Fiber #3 | 14 | 42 | 0.5 | 0.5 | 43 |
| Fiber #4 | 11 | 43 | 0.5 | 0.5 | 45 |

The day before the dope solution was prepared, a total of 20 wt % of a dope consisting of PEI, NMP, DI water, and $LiNO_3$ was mixed using a roller in a closed glass container (50 ml) at 60° C. for 24 hours so that all of the dope could be easily dispersed. 100% MgO was added to an 80% solution of an NMP/water/$LiNO_3$ mixture and dispersed completely through an ultrasonic horn and an impeller. The prepared dope was added to the dope solution and dispersed at 60° C. through a rotating impeller. Then, 20% of the PEI was slowly added to the dope and mixed to homogeneity using the above-mentioned method. The dope was mixed overnight with a heated roller and then slowly introduced into a syringe pump to prevent the formation of bubbles. The added dope was degassed at 60° C. for 3 hours to reduce gravitational sedimentation of the adsorbent material in the solution. As shown in FIG. 1, a polymer fiber adsorbent precursor having a metal oxide precursor that is stable in water was prepared.

The polymer fiber adsorbent precursor module was packaged as a stainless steel module for further moisture-free synthesis. The spun polymer fiber adsorbent precursor was crosslinked, followed by conversion to metal oxide having an ultra-fine structure. Then, the amine residue was injected to further improve the $CO_2$ capacity and moisture resistance of the polymer fiber adsorbent. The spinning parameters used herein are shown in Table 2.

TABLE 2

| Bore fluid composition (wt %) | 90/10 (NMP/water) |
|---|---|
| Central fluid rate (ml/h) | 240-320 |
| Bore fluid rate (ml/h) | 0-80 |
| Air gap (cm) | 3 |
| Drum take-up velocity | 10-20 |
| Spinning temperature (° C.) | 25 |
| Quench bath temperature (° C.) | 50 |

Finally, after the spinning process, solvent exchange between deionized water/methanol/hexane was performed to prevent collapse of the pores in the polymer matrix of the spun polymer fiber adsorbent.

Crosslinking of Spun Polymeric Fiber Adsorbent Precursor

Crosslinking was performed in order to increase the chemical resistance to DMF.

For chemical crosslinking, the polymer fiber adsorbent precursor was chemically crosslinked with diamine groups such as ethylenediamine (EDA) and p-xylylenediamine (XDA). The polymer fiber adsorbent precursor was immersed in a 100 ml methanol solution containing 1.5 g of EDA and 3.5 g of XDA for 4 hours and washed with fresh methanol to remove the residual crosslinking agent.

The thermal crosslinking was performed by loading a polymer fiber adsorbent in a tube furnace and heating the same to 300° C. in the presence of argon for 2 hours.

Conversion from MgO/PEI polymer fiber adsorbent precursor to MOF

In order to convert the MgO/PEI polymer fiber adsorbent precursor into an $Mg_2$ (dobpdc) MOF/PEI polymer fiber adsorbent, 187 mg of $H_4$ (dobpdc) ligand and 4 ml of DMF were charged in a pressurized glass tank serving as a batch reactor, and the ligand was completely dissolved therein. Then, 80 mg of the MgO/PEI polymer fiber adsorbent precursor, corresponding to 60 mg of MgO, was added to the reactor and maintained at 110° C. in a synthesis oven for 12 hours. Finally, the resulting $Mg_2$ (dobpdc) MOF/PEI polymer fiber adsorbent was washed with DMF and then methanol, and then activated at 100° C. overnight in a vacuum.

Introduction of Diamine (Mmen) Functional Group

In order to introduce a diamine group into the MOF, the activated $Mg_2$ (dobpdc) MOF/PEI polymer fiber adsorbent was immersed in 2 ml of N,N'-dimethylethylenediamine (mmen) and 18 ml of anhydrous hexane for 4 hours. Then, the mmen-$Mg_2$ (dobpdc) MOF/PEI polymer fiber adsorbent was washed with hexane and dried in a vacuum.

In-Situ Synthesis in Device for Manufacturing Module

The device for manufacturing the polymer fiber adsorbent module having an active length to total length of 15/30 cm was configured to have an inner diameter of ¼ inch. The fiber reservoir included about 10 polymer fiber adsorbent precursors and a ligand feeder filled with ligand materials and DMF, and based on this configuration, the ligand materials and DMF travelled overnight to the fiber reservoir through a syringe pump for MOF conversion at a rate of 25 ml/min. After the reaction, the sample/module was washed and cut. In the same manner as above, a diamine solution containing mmen and anhydrous hexane was made to flow through the module for 4 hours, and then the sample was washed and dried at a temperature of 80° C. in a vacuum.

Experimental Example 1

Confirmation of Conditions of Conversion from MOF Precursor to MOF

Figure 3:
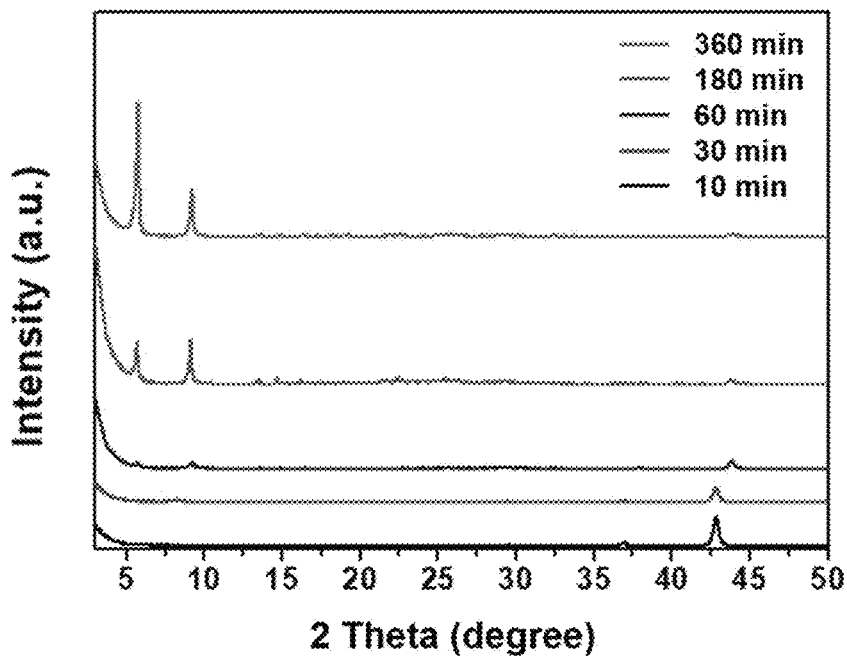
FIG. 3 is a graph showing, as a function of reaction time, the result of XRD analysis of MOF particles converted from a MgO powder according to an experimental example of the present invention.

XRD analysis was performed on MgO in the material preparation step of Example 1 while varying the reaction time during conversion to MOF and the result is shown in FIG. 3.

Figure 4:
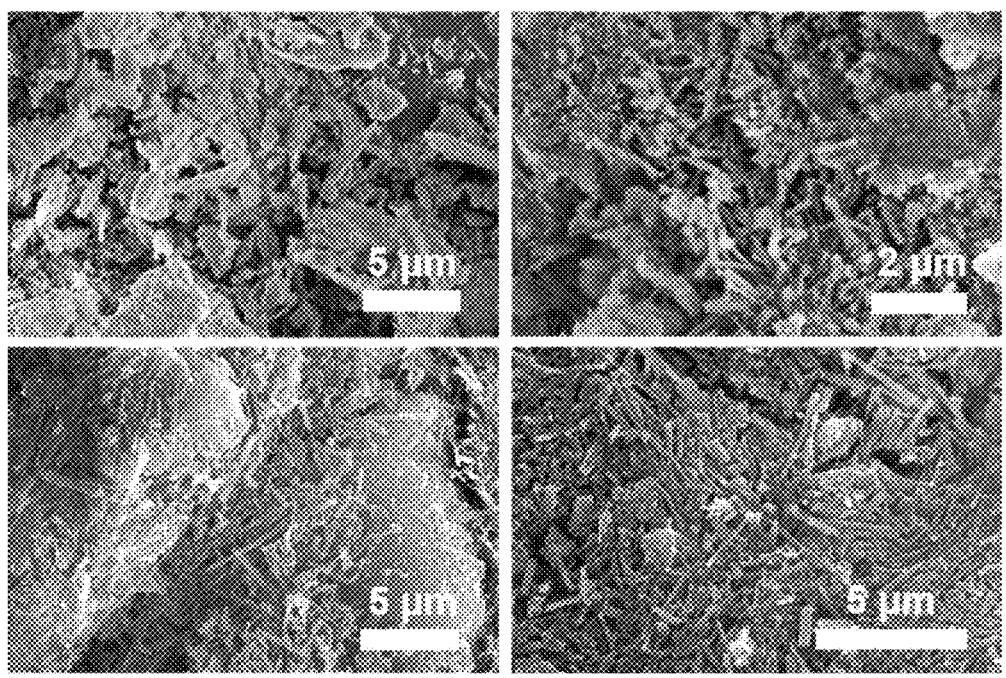
FIG. 4 is an SEM image showing, as a function of reaction time, the MOF particles converted from MgO powder according to an experimental example of the present invention, wherein the reaction time is 30 minutes, 60 minutes, 180 minutes and 360 minutes for (a), (b), (c), and (d), respectively.

The analysis was performed at a constant reaction temperature of 120° C. and it can be seen that the conversion rate of MgO to $Mg_2$ (dobpdc) increases when the reaction time increases. It can be seen that when the reaction time increases to 360 minutes, the reflection from MgO disappears and complete conversion of MgO to $Mg_2$ (dobpdc) is achieved. FIG. 4 illustrates an SEM image of $Mg_2$ (dobpdc) MOF particles obtained from MgO powder as a function of reaction time. As the reaction time increases, the number of rod-shaped $Mg_2$ (dobpdc) MOF particles increases. Like the results of XRD analysis, it can be seen that the MOF conversion reaction is almost complete within about 360 minutes.

Experimental Example 2

Morphology Analysis of MgO/PEI Polymer Fiber Adsorbent Precursor

Figure 5:
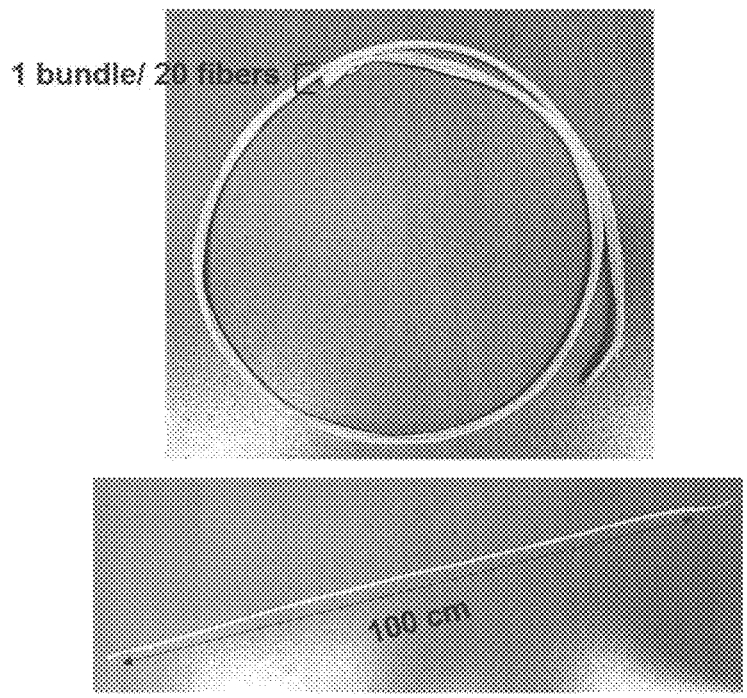
FIG. 5 is an image illustrating a MgO/PEI polymer fiber bundle, which is a polymer fiber adsorbent precursor according to an embodiment of the present invention.
Figure 6:
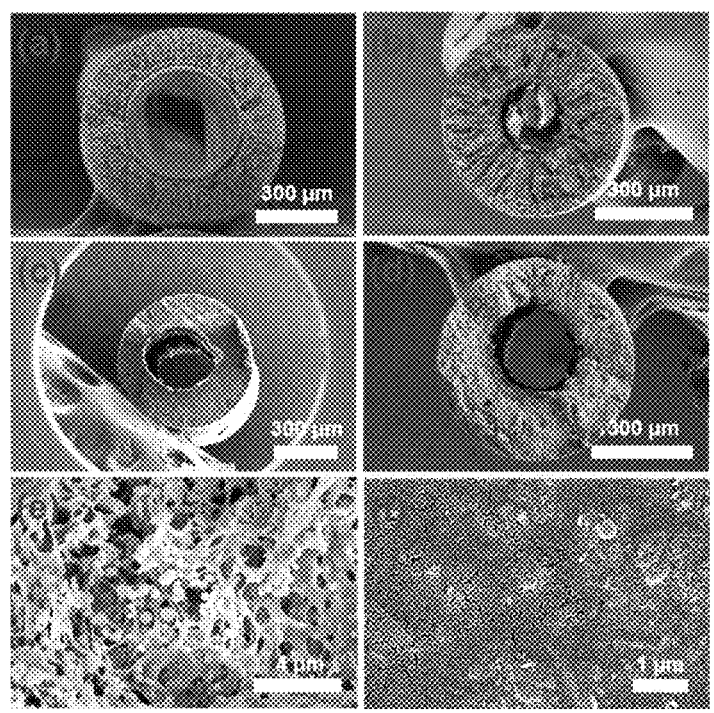
FIG. 6 is an SEM image illustrating a MgO/PEI polymer fiber, which is a polymer fiber adsorbent precursor according to an embodiment of the present invention, wherein (a) is fiber #1 of Example 1, (b) is fiber #2 of Example 1, (c) is fiber #3 of Example 1, and (d)-(f) are fiber #4 of Example 1.

FIG. 5 is an image illustrating a polymer fiber adsorbent precursor obtained by the spinning process in Example 1 (20 polymer fiber adsorbent precursors having a length of 100 cm form one bundle). FIG. 6 illustrates cross-sectional SEM images of MgO/PEI polymer fiber adsorbent precursors having various compositions shown in Table 1, showing that the spun polymer fiber adsorbent precursor has an asymmetric open pore structure. Fiber #1 and Fiber #2 (FIGS. 6(a) and 6(b)) have finger-shaped pores which reduce the mechanical stability of the polymer matrix due to the relatively large pore size thereof. By adding $LiNO_3$ as a non-solvent to form pores and increasing the polymer content in the polymer solution through optimization of spinning, the formation of finger-shaped pores can be minimized and a porous polymer matrix that has open pores in the form of a sponge was formed, as shown in FIGS. 6(c) and 6(d). Finally, a polymer fiber adsorbent precursor containing 75 wt % MgO was obtained from fiber #4 (FIG. 6(d)). It can be seen that MgO is uniformly distributed in the polymer matrix in the bulk and on the surface of fiber #4, and that the surface of the polymer fiber adsorbent is porous (FIGS. 6(e) and 6(f)).

Experimental Example 3

Characterization of MgO/PEI Polymer Fiber Adsorbent Precursor Depending on Crosslinking Method Pure (uncrosslinked) MgO/PEI polymer fiber adsorbent precursors are very susceptible to DMF at high temperatures under harsh chemical environments. As can be seen from Example 1, in order to improve the chemical and mechanical stability of the fiber absorbent, two post-spinning crosslinking methods, namely thermal crosslinking and chemical (diamine-assisted) crosslinking, were performed. Each crosslinking method effectively improved the chemical stability of the original PEI matrix. The extent of swelling of crosslinked MgO/PEI fibers was tested at 110° C. and 120° C. in the presence of DMF, and no remarkable swelling was observed in either crosslinking method.

Figure 7:
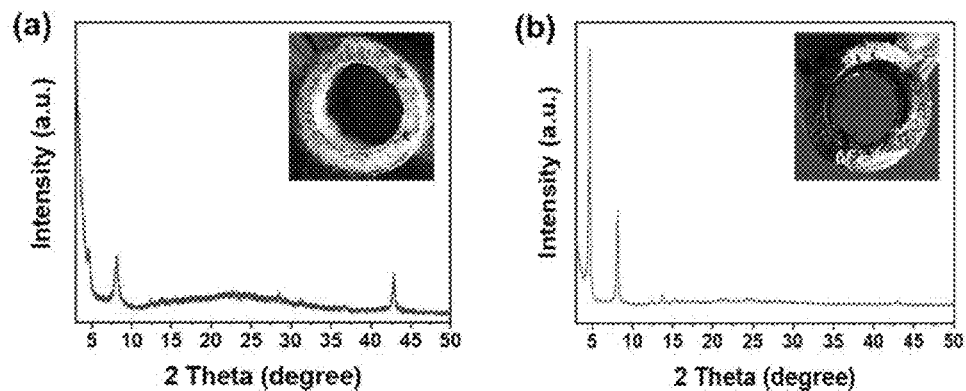
FIG. 7 illustrates the result of XRD analysis and an SEM image of the polymer fiber adsorbent according to an embodiment of the present invention when different cross-linking methods, more particularly, (a) thermal crosslinking and (b) chemical crosslinking, are used.

Several analyses were performed to determine the effects of crosslinking on the MOF conversion reaction. FIGS. 7(a) and 7(b) illustrate XRD patterns and cross-sectional SEM images of crosslinked $Mg_2$ (dobpdc) MOF/PEI polymer fiber adsorbents produced from precursors by two different crosslinking methods. It can be seen from FIG. 7A that the thermally crosslinked polymer fiber adsorbent exhibits residual MgO peaks after the MOF conversion reaction and the reaction rate is inhibited due to a decrease in the ligand diffusion rate through thermal contraction of the polymer matrix.

However, it can be seen from FIG. 7(b) that the chemically crosslinked polymer fiber adsorbent exhibits almost complete MOF conversion without breaking the fiber matrix under the same conditions and that the chemical crosslinking process can increase the stability of the polymer fiber adsorbent.

Experimental Example 4

Characterization of Polymer Fiber Adsorbent Converted to MOF

Figure 8:
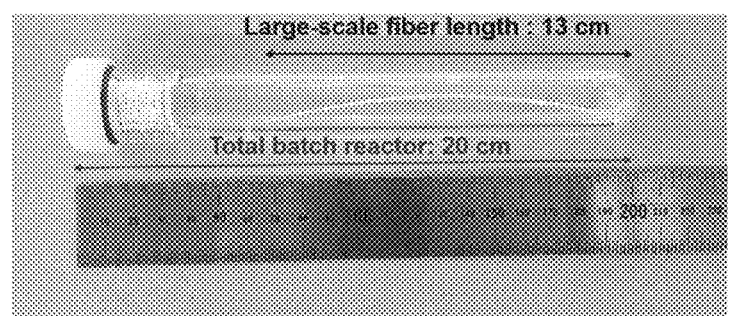
FIG. 8 illustrates a batch reactor and a large-scale polymer fiber used in an embodiment of the present invention.
Figure 9:
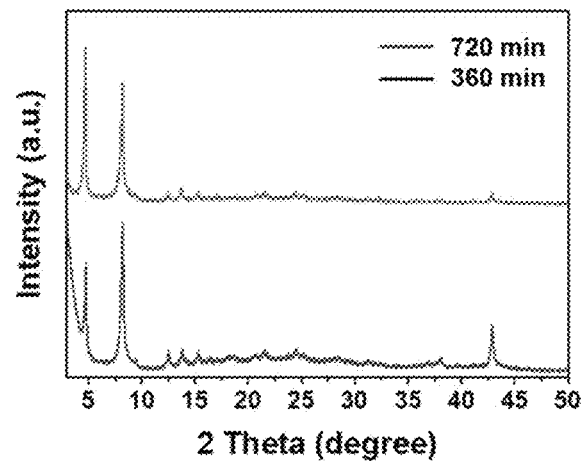
FIG. 9 illustrates the results of XRD analysis of the polymer fiber adsorbent according to an embodiment of the present invention at various reaction times.
Figure 10:
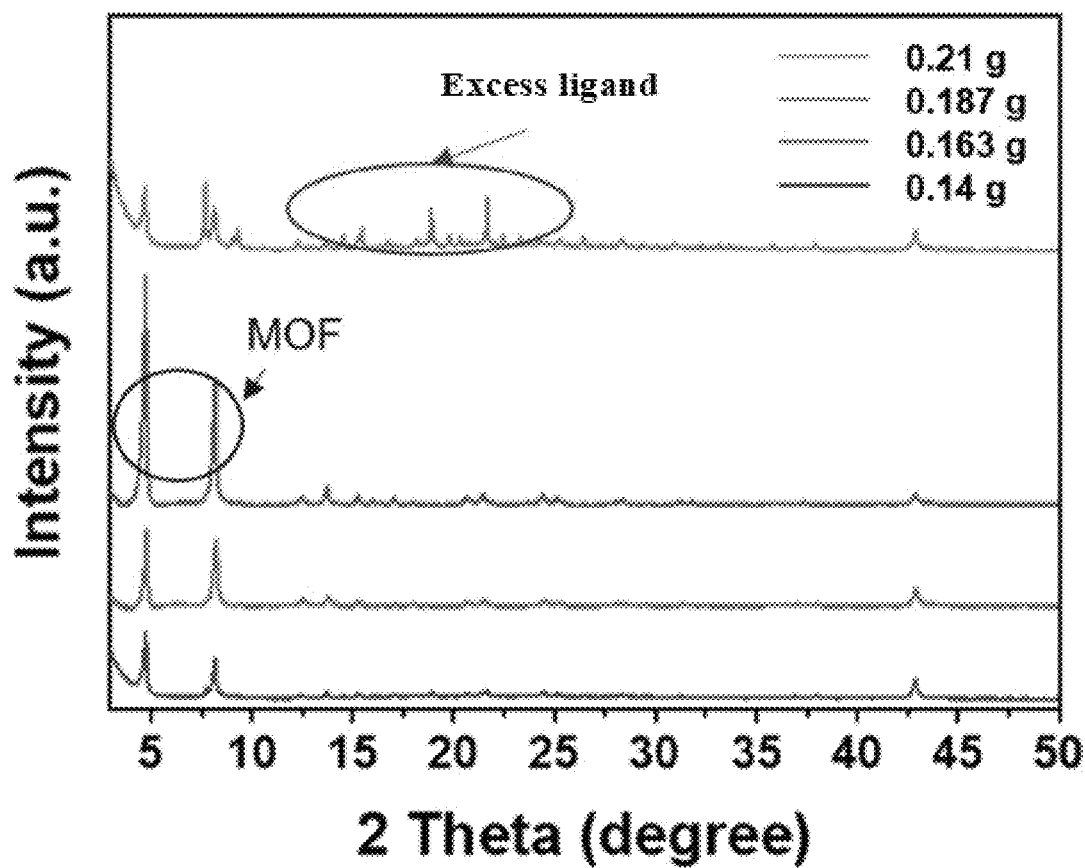
FIG. 10 illustrates the results of XRD analysis of the polymer fiber adsorbent according to an embodiment of the present invention for different amounts of various ligand materials.
Figure 11:
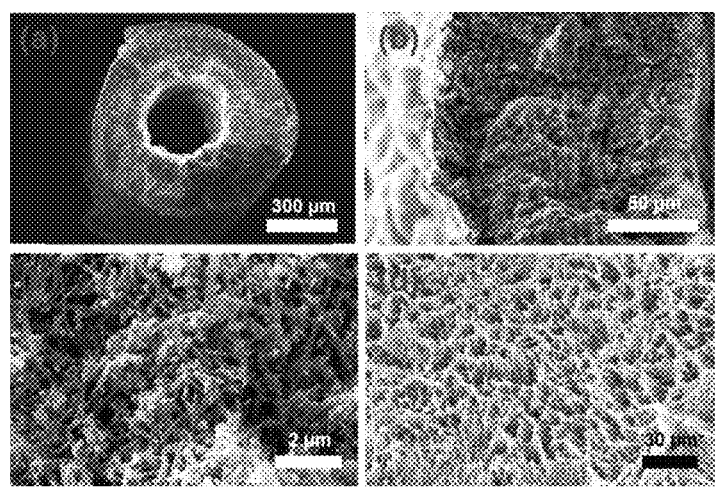
FIG. 11 is a SEM image showing the cross-section of the polymer fiber adsorbent according to an embodiment of the present invention, wherein (a) to (c) show the cross-section of the polymer fiber adsorbent and (d) shows the surface of the polymer fiber adsorbent.

The MOF conversion reaction of the MgO/PEI polymer fiber adsorbent precursor was performed based on the optimal conditions determined in Experimental Examples 1 to 3. FIG. 8 illustrates the batch reactor used in the research and the adsorbent made of hollow fibers having a length of approximately 13 cm. In the case of MgO powder contained in the polymer matrix, the polymer fiber adsorbent took twice the reaction time due to the reduced accessibility of the ligand to MgO (FIG. 9). The XRD pattern of FIG. 10 showed the $Mg_2$ (dobpdc)/PEI polymer fiber adsorbents formed with various amounts of ligands. As the molar concentration of the ligand increased, the rate of the conversion reaction increased. However, when the amount of the ligand exceeded 0.187 g, unreacted ligand was recrystallized on the surface of the polymer fiber adsorbent. Optimized reaction conditions for the batch reaction of the $Mg_2$ (dobpdc)/PEI polymer fiber adsorbent were determined to be a reaction temperature of 110° C., a reaction time of 720 minutes, and an amount of the ligand material of 0.187 g. FIG. 11 is an SEM image illustrating the optimized $Mg_2$(dobpdc)/PEI hollow fiber adsorbent of fiber #4. The width of the sample increased slightly to approximately 950 μm in FIG. 11(a), and the expansion of the polymer fiber adsorbent matrix was considered to be due to complicated causes. Overall, the polymer matrix was filled with long rod-shaped $Mg_2$ (dobpdc) particles (FIGS. 11(b)-11(d)).

Figure 12:
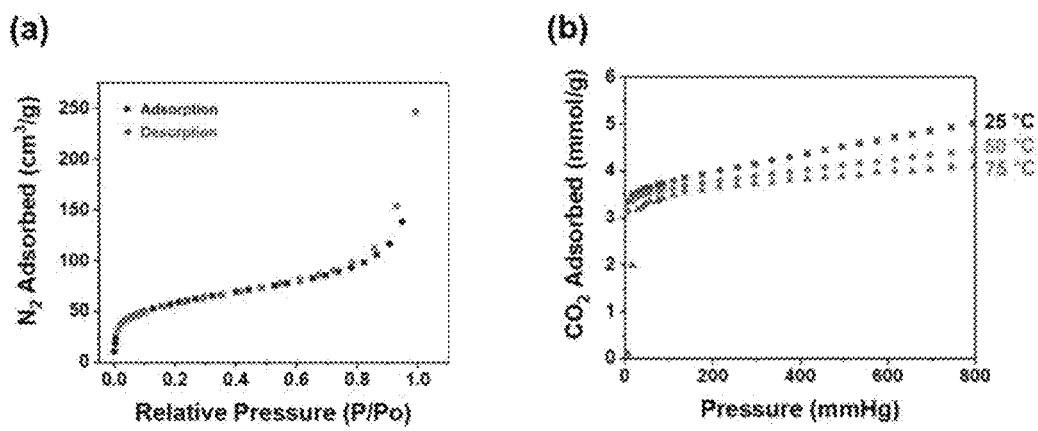
FIG. 12 is a graph showing the degree of $N_2$ physical adsorption (a) and dry $CO_2$ adsorption (b) at 77K of the polymer fiber adsorbent according to an embodiment of the present invention.

Then, based on the optimal conditions in the batch reactor, the polymer fiber adsorbent precursor underwent in-situ synthesis in a continuous flow module in a moisture-free environment. The module was filled with about 10 fibers, and all connections have ¼ fitting, a total length of 30 cm, and an active length of 15 cm (FIG. 12).

Experimental Example 5

Adsorbent Performance Evaluation

Figure 13:
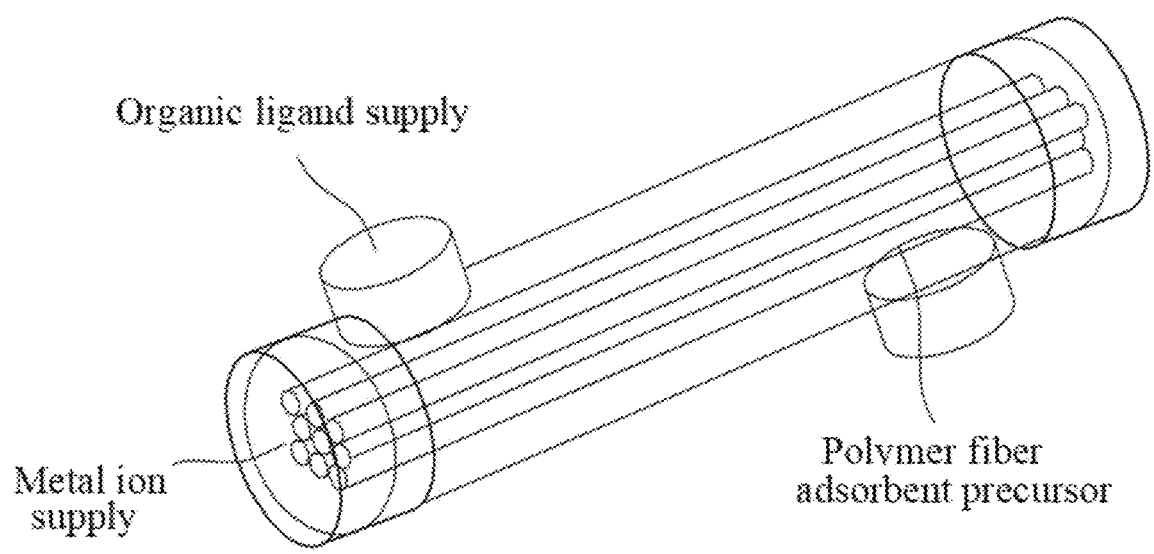
FIG. 13 is a schematic diagram illustrating a device for manufacturing a polymer fiber adsorbent module used in an embodiment of the present invention.

As can be seen from Example 1, when MOF conversion was completed, N,N'-dimethylethylenediamine (mmen) was completely injected into the $Mg_2$ (dobpdc)/PEI polymer fiber adsorbent to improve the adsorption capacity and stability of the polymer fiber adsorbent. FIGS. 12(a) and 12(b) show the results of $N_2$ physical adsorption and dry $CO_2$ adsorption at 77 K of mmen-Mg 2(dobpdc)/PEI hollow fiber adsorbent prepared from fiber #4. The BET surface area and pore size of the sample were calculated to be 199.5 $m^2/g$ and 0.99 nm, respectively. FIG. 13(b) illustrates the dry $CO_2$ adsorption capacity of the mmen-$Mg_2$ (dobpdc)/PEI polymer fiber adsorbent. It can be seen that the polymer fiber adsorbent had a dry $CO_2$ adsorption capacity of 4.44 mmol/g at 25° C. and 1 bar, which means that the polymer fiber adsorbent of Example 1 was a high-performance MOF polymer fiber adsorbent that successfully underwent MOF conversion.

INDUSTRIAL APPLICABILITY

The method for preparing a polymer fiber adsorbent according to the present invention enables easy synthesis of water-sensitive MOFs and thus is effective in providing polymer fiber adsorbents that exhibit excellent adsorption capacity and long-term stability during the capture of carbon dioxide from a flue gas stream or before combustion.

Although specific configurations of the present invention have been described in detail, those skilled in the art will appreciate that this description is provided to set forth preferred embodiments for illustrative purposes and should not be construed as limiting the scope of the present invention. Therefore, the substantial scope of the present invention is defined by the accompanying claims and equivalents thereto.

The invention claimed is:

1. A method of preparing a polymer fiber adsorbent comprising MOFs (Metal-Organic Frameworks) uniformly distributed in a polymer matrix, the method comprising:
   (a) spinning a spinning dope comprising the polymer matrix and a metal precursor of the MOFs to form a polymer fiber adsorbent precursor containing the metal precursor;
   (b) immersing the polymer fiber adsorbent precursor formed in step (a) in a solution containing an amine group to crosslink the polymer fiber adsorbent precursor with the amine group; and
   (c) contacting the polymer fiber adsorbent precursor with the organic ligand of the MOFs to form MOFs inside the polymer matrix of the polymer fiber adsorbent precursor.

2. The method of preparing a polymer fiber adsorbent of claim 1, wherein the metal precursor of the MOFs comprises one or more selected from the group consisting of metal oxide, metal nitrate, metal acetate, metal bromide and metal chloride.

3. The method of preparing a polymer fiber adsorbent of claim 1, wherein the metal of the metal precursor of the MOFs comprises one or more selected from the group consisting of Mg, Al, Y, Sc, Mo, Ti, V, Cr, Mn, Fe, Co, Ni, Cu, Zr, Cd, Ca, Pd, Pt, Au, Ag, Ru, Gd, Eu, Tb and Zn.

4. The method of preparing a polymer fiber adsorbent of claim 1, wherein the organic ligand of the MOFs comprises one or more selected from the group consisting of 4,4'-dioxido-3,3'-biphenyl dicarboxylate, 2,5-dioxido-1,4-benzene dicarboxylate, 1,5-dioxide-2,6-naphthalenedicarboxylate, 4,4'-dioxido-3,3'-triphenyldicarboxylate, 2,5-dihydroxyterephthalic acid, 4-(4-carboxy-3-hydroxyphenyl)-2-hydroxy-benzoic acid, 4,4'-ethynylenedibenzoic acid, 1,3,5-benzenetricarboxylate, 2-bromo-1,4-benzenedicarboxylic acid, pyridine-3-carboxylic acid, 2-methyl-1H-imidazole, 4-methyl-5-imidazolecarboxaldehyde, and biphenyl-4,4'-dicarboxylic acid.

5. The method of preparing a polymer fiber adsorbent of claim 1, wherein step (b) is performed at a temperature of 25 to 150° C.

6. The method of preparing a polymer fiber adsorbent of claim 1, wherein step (a) is performed through phase transition.

7. The method of preparing a polymer fiber adsorbent of claim 1, wherein the spinning dope further comprises a pore former.

8. The method of preparing a polymer fiber adsorbent of claim 1, further comprising (d) immersing the polymer fiber adsorbent precursor in a solution containing an amine group to functionalize the amine group in the MOFs, after step (c).

9. The method of preparing a polymer fiber adsorbent of claim 1, wherein in step (a), a content of the metal precursor of the MOFs is 30 wt % to 95 wt %.

10. The method of preparing a polymer fiber adsorbent of claim 1, wherein the MOF comprises:
   one or more metal elements selected from the group consisting of Mg, Al, Y, Sc, Mo, Ti, V, Cr, Mn, Fe, Co, Ni, Cu, Zr, Cd, Ca, Pd, Pt, Au, Ag, Ru, Gd, Eu, Tb and Zn; and
   one or more organic molecules selected from the group consisting of 4,4'-dioxido-3,3'-biphenyl dicarboxylate, 2,5-dioxido-1,4-benzene dicarboxylate, 1,5-dioxide-2,6-naphthalenedicarboxylate, 4,4'-dioxido-3,3'-triphenyldicarboxylate, 2,5-dihydroxyterephthalic acid, 4-(4-carboxy-3-hydroxy-phenyl)-2-hydroxy-benzoic acid, 4,4'-ethynylenedibenzoic acid, 1,3,5-benzenetricarboxylate, 2-bromo-1,4-benzenedicarboxylic acid, pyridine-3-carboxylic acid, 2-methyl-1H-imidazole, 4-methyl-5-imidazolecarboxaldehyde, and biphenyl-4,4'-dicarboxylic acid.

11. The method of preparing a polymer fiber adsorbent of claim 1, wherein step (c) further comprises supplying a metal ion.

12. The method of preparing a polymer fiber adsorbent of claim 1, wherein the polymer fiber adsorbent is a monolithic fiber or a hollow fiber.

13. A method of manufacturing a polymer fiber adsorbent module, the method comprising:
   spinning a spinning dope comprising a polymer matrix and a metal precursor of MOFs to form a polymer fiber adsorbent precursor containing the metal precursor;
   loading a plurality of polymer fiber adsorbent precursors including the polymer fiber adsorbent precursor in a module to form a polymer fiber adsorbent precursor module;

immersing the polymer fiber adsorbent precursor module in a solution containing an amine group to crosslink the polymer fiber adsorbent precursor module with the amine group; and contacting the polymer fiber adsorbent precursor module with an organic ligand of the MOFs to form the MOFs inside the polymer matrix of the polymer fiber adsorbent precursor.

14. A polymer fiber adsorbent module manufactured by the method of claim 13, and comprising a monolithic fiber or a hollow fiber in which MOFs are uniformly distributed throughout a polymer matrix.

15. The polymer fiber adsorbent module of claim 14, wherein the polymer fiber adsorbent module comprises a hollow fiber, and has an outer surface thickness of 100 μm to 1,000 μm, a bore thickness of 50 μm to 1,000 μm, and a porosity of 30 vol % to 80 vol %.

16. The polymer fiber adsorbent module of claim 14, comprising functionalized amine groups inside the MOFs.

* * * * *